US011081917B2

(12) United States Patent
Torrey et al.

(10) Patent No.: US 11,081,917 B2
(45) Date of Patent: Aug. 3, 2021

(54) ELECTRIC MACHINE AND A TURBO MACHINE HAVING THE SAME

(71) Applicant: GENERAL ELECTRIC COMPANY, Schenectady, NY (US)

(72) Inventors: David Allan Torrey, Ballston Spa, NY (US); Mohamed Osama, Garching (DE); Joseph John Zierer, Niskayuna, NY (US); Lijun He, Schenectady, NY (US); Andrew Thomas Cross, Waterford, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 12 days.

(21) Appl. No.: 16/203,621

(22) Filed: Nov. 29, 2018

(65) Prior Publication Data

US 2020/0177039 A1    Jun. 4, 2020

(51) Int. Cl.
*H02K 1/00* (2006.01)
*H02K 1/27* (2006.01)
(Continued)

(52) U.S. Cl.
CPC ......... *H02K 1/2773* (2013.01); *H02K 7/1823* (2013.01); *F01D 15/10* (2013.01);
(Continued)

(58) Field of Classification Search
CPC ........ H02K 1/2773; H02K 7/116; H02K 1/28; H02K 1/272; F01D 15/10; F05D 2220/32; F05D 2220/3215; F05D 2220/768
(Continued)

(56) References Cited

U.S. PATENT DOCUMENTS 3,979,821 A * 9/1976 Noodleman ......... H02K 13/006
29/598
4,327,302 A * 4/1982 Hershberger ......... D06F 37/304
310/156.56
(Continued)

FOREIGN PATENT DOCUMENTS

DE         1563040 A1    4/1970
DE    102010061778 A1    5/2012
(Continued)

OTHER PUBLICATIONS

Boglietti et al., "The safety critical electric machines and drives in the more electric aircraft: A survey", 2009 35th Annual Conference of IEEE Industrial Electronics, pp. 2587-2594, Portugal, Nov. 2009.
(Continued)

*Primary Examiner* — Julio C. Gonzalez
(74) *Attorney, Agent, or Firm* — Dority & Manning, P.A.

(57) ABSTRACT

An electric machine includes at least one rotor module. A rotor module includes a rotor hub having a hub body, and a plurality of first protrusions and a plurality of second protrusions. One or more first protrusions include an elongated portion and a head portion. One or more second protrusions include a wedge-shaped profile. The rotor module further includes a magnetic core having a plurality of core members disposed on the rotor hub. A core member of the plurality of core members is disposed such that the head portion of the first protrusion located between the adjacent second protrusions engages with the core member, and each of the one or more second protrusions extends at least partially in a space between adjacent core members of the plurality of core members. Moreover, the rotor module includes a permanent magnet disposed in a space between the adjacent core members.

19 Claims, 8 Drawing Sheets

(51) Int. Cl.
*H02K 7/18* (2006.01)
*F01D 15/10* (2006.01)
*H02K 7/116* (2006.01)

(52) U.S. Cl.
CPC .. *F05D 2220/32* (2013.01); *F05D 2220/3215* (2013.01); *F05D 2220/768* (2013.01); *H02K 7/116* (2013.01)

(58) Field of Classification Search
USPC .......................................................... 290/52
See application file for complete search history.

(56) References Cited

U.S. PATENT DOCUMENTS

| | | | | |
|---|---|---|---|---|
| 4,332,079 | A * | 6/1982 | Silver | H02K 1/278 29/598 |
| 4,700,096 | A * | 10/1987 | Epars | H02K 1/2773 310/153 |
| 6,467,725 | B1 | 10/2002 | Coles et al. | |
| 7,841,163 | B2 | 11/2010 | Welch et al. | |
| 8,375,695 | B2 | 2/2013 | Schilling et al. | |
| 9,003,811 | B2 | 4/2015 | Barnett et al. | |
| 9,051,881 | B2 | 6/2015 | Bettner | |
| 9,917,490 | B2 | 3/2018 | Lemmers et al. | |
| 9,938,850 | B2 | 4/2018 | Edwards et al. | |
| 2002/0163260 | A1 * | 11/2002 | Kusase | H02K 1/2773 310/68 D |
| 2008/0265705 | A1 * | 10/2008 | Kinoshita | H02K 1/2766 310/156.44 |
| 2010/0219779 | A1 * | 9/2010 | Bradbrook | F02C 3/113 318/153 |
| 2011/0121668 | A1 * | 5/2011 | Condamin | H02K 1/2773 310/51 |
| 2013/0241340 | A1 * | 9/2013 | Koga | H02K 1/2773 310/156.56 |
| 2014/0062254 | A1 * | 3/2014 | Nakatsugawa | H02K 1/2773 310/216.094 |
| 2014/0103771 | A1 * | 4/2014 | Figgins | H02K 1/28 310/156.15 |
| 2015/0035402 | A1 * | 2/2015 | Reddy | H02K 1/272 310/156.01 |
| 2015/0069879 | A1 * | 3/2015 | Papini | H02K 1/246 310/216.123 |
| 2015/0380997 | A1 * | 12/2015 | Song | H02K 1/2773 310/156.08 |
| 2017/0137143 | A1 | 5/2017 | Demelas | |
| 2017/0163108 | A1 * | 6/2017 | Schencke | H02K 21/028 |
| 2018/0131250 | A1 * | 5/2018 | Jewell | F16D 27/01 |
| 2019/0103791 | A1 * | 4/2019 | Goel | H02K 15/03 |

FOREIGN PATENT DOCUMENTS

| | | | |
|---|---|---|---|
| EP | 2863518 | A2 | 4/2015 |
| GB | 2546298 | A | 7/2017 |

OTHER PUBLICATIONS

European Search Report Corresponding to Application No. 19206685 dated Apr. 21, 2020.

* cited by examiner

ELECTRIC MACHINE AND A TURBO MACHINE HAVING THE SAME

TECHNICAL FIELD

Embodiments of the present specification generally relate to an electric machine and, in particular to an interior permanent magnet electric machine having magnetic spoke rotor and a turbo machine having such electric machine.

BACKGROUND

Electric machines such as interior permanent magnet (IPM) motors and/or generators have been widely used in a variety of applications including aircraft, automobiles and industrial usage. Therefore, a requirement for lightweight and high-power density IPM motors/generators has resulted in the design of higher speed motors and generators to maximize the power to weight ratio. Hence, a trend is increasing acceptance of IPM machines offering high machine speed, high power density, reduced mass and cost.

In a conventional IPM machine, multiple permanent magnets are embedded inside multiple laminations of a rotor. The mechanical stresses in the rotor are concentrated in multiple bridges and center posts. For higher speed applications, the thickness of the multiple bridges and center posts have to be increased for enhanced structural strength of the rotor and various other parts. The increased thickness leads to more magnet flux leakage into the multiple bridges and center posts, which leakage significantly reduces the machine power density, resulting in decreased efficiency of the machine because additional stator current is required. Further, in an application such as aircraft engines, such electric machines are disposed in a very harsh environment effected by hot gasses exiting the aircraft engine. Also, a space available to dispose such electric machines is limited in the aircraft engines.

BRIEF DESCRIPTION

In accordance with one embodiment of the present specification, an electric machine is presented. The electric machine includes a stator and a rotor disposed concentric to the stator. The rotor includes at least one rotor module. A rotor module of the at least one rotor module includes a rotor hub having a hub body, and a plurality of first protrusions and a plurality of second protrusions located alternatingly on a periphery of the hub body and protruding radially from the hub body, where one or more first protrusions of the plurality of first protrusions include an elongated portion and a head portion, and one or more second protrusions of the plurality of second protrusions include a wedge-shaped profile having a base portion and a top portion, wherein a width of the top portion is more than a width of the base portion. The rotor module further includes a magnetic core having a plurality of core members disposed on the rotor hub, where a core member of the plurality of core members is disposed between adjacent second protrusions of the plurality of second protrusions such that the head portion of the first protrusion located between the adjacent second protrusions engages with the core member, and each of the one or more second protrusions extends at least partially in a space between adjacent core members of the plurality of core members. Moreover, the rotor module includes a plurality of permanent magnets, where a permanent magnet of the plurality of permanent magnets is disposed in a space between the adjacent core members.

In accordance with another embodiment of the present specification, a turbo machine is presented. The turbo machine includes a turbine, a tail cone disposed downstream of the turbine, and the electric machine disposed inside the tail cone and mechanically coupled to the turbine.

DRAWINGS

These and other features, aspects, and advantages of the present specification will become better understood when the following detailed description is read with reference to the accompanying drawings in which like characters represent like parts throughout the drawings, wherein.

DETAILED DESCRIPTION

Figure 1:
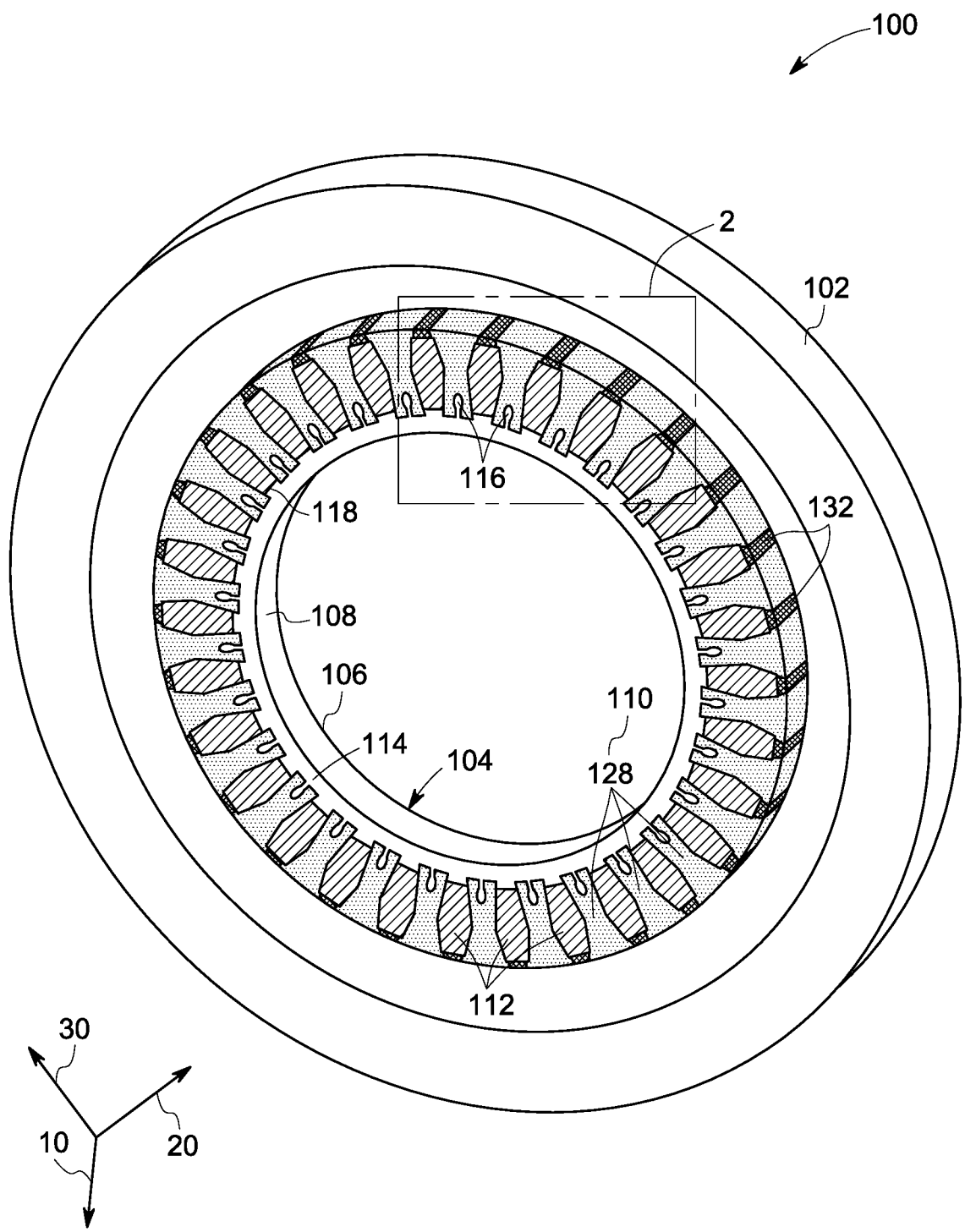
FIG. 1 is a cross-sectional perspective view of an electric machine, in accordance with one embodiment of the present specification.

In an effort to provide a concise description of these embodiments, all features of an actual implementation may not be described in the specification. It should be appreciated that in the development of any such actual implementation, as in any engineering or design project, numerous implementation-specific decisions may be made to achieve the developer's specific goals such as compliance with system-related and business-related constraints.

Unless defined otherwise, technical and scientific terms used herein have the same meaning as is commonly understood by one of ordinary skill in the art to which this specification belongs. The terms "first", "second", and the like, as used herein do not denote any order, quantity, or importance, but rather are used to distinguish one element from another. Also, the teams "a" and "an" do not denote a limitation of quantity, but rather denote the presence of at least one of the referenced items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

As will be described in detail hereinafter, various embodiments of an electric machine are presented. The electric machine includes a stator and a rotor disposed concentric to the stator. The rotor includes at least one rotor module. A rotor module of the at least one rotor module includes a rotor hub having a hub body, and a plurality of first protrusions and a plurality of second protrusions located alternatingly on a periphery of the hub body and protruding radially from the hub body, wherein one or more first protrusions of the plurality of first protrusions include an elongated portion and a head portion, and one or more second protrusions of the plurality of second protrusions include a wedge-shaped profile. The rotor module further includes a magnetic core having a plurality of core members disposed on the rotor hub, wherein a core member of the plurality of core members is disposed between adjacent second protrusions of the plurality of second protrusions such that the head portion of the first protrusion located between the adjacent second protrusions engages with the core member, and each of the one or more second protrusions extends at least partially in a space between adjacent core members of the plurality of core members, and wherein the one or more second protrusions include a base portion and a top portion, wherein a width of the top portion is more than a width of the base portion. Moreover, the rotor module includes a plurality of permanent magnets, wherein a permanent magnet of the plurality of permanent magnets is disposed in a space between the adjacent core members.

Referring now to FIG. 1, a cross-sectional perspective view of an electric machine 100 is presented, in accordance with one embodiment of the present specification. In FIG. 1, reference numerals 10, 20, and 30 respectively represent a radial direction, an axial direction, and a tangential direction of the electric machine 100. In some embodiments, the electric machine 100 may be configured to be operated as a generator, while in certain embodiments, the electric machine 100 may be configured to be operated as a motor, without limiting the scope of the present specification. For consistency of illustration, the electric machine 100 will be described as the generator in the description hereinafter.

As depicted in FIG. 1, the electric machine 100 includes a stator 102 and a rotor 104. Typically, the stator 102 includes a single-phase or multi-phase (e.g., three phase) stator winding (not shown). By way of example, in order to minimize coupling among phase windings in the stator winding, the stator winding may be arranged as a fractional slot concentrated tooth winding, in some embodiments. It will be appreciated that other types of stator winding arrangements, including but not limited to, integral slot distributed windings and/or fractional slot distributed windings, may also be employed without limiting the scope of the present specification.

The rotor 104 may be disposed concentric to the stator 102. In the embodiment of FIG. 1, the rotor 104 is shown as disposed concentrically inside the stator 102. In certain other embodiments, a rotor may be disposed concentrically outside a stator with appropriate structural changes (see FIG. 10, for example), as will be apparent to those skilled in the art.

Further, the rotor 104 may include at least one rotor module. In the embodiment of FIG. 1, the rotor 104 is shown to include a single rotor module 106. In such a configuration of the rotor 104 with the single rotor module 106, an axial length of the rotor module 106 may be equal to or substantially equal to an axial length of the stator 102. In some embodiments, the rotor 104 may include two or more rotor modules (see FIGS. 6 and 7A-7C, described later). In such a configuration of the rotor 104 with two or more rotor modules, an axial length of a stack of the rotor modules may be equal to or substantially equal to an axial length of the stator 102.

In some embodiments, the rotor module 106 may include a rotor hub 108, a magnetic core 110, and a plurality of permanent magnets 112. The rotor hub 108 may also be referred to as a rotor shaft. The rotor hub 108 may be formed using multiple laminations. In some other embodiments, the rotor hub 108 may be non-laminated.

In some embodiments, the rotor hub 108 is made of one or more magnetic materials. In some embodiments, the rotor hub 108 is made of one or more non-magnetic materials. Examples of the non-magnetic materials used to form the non-magnetic inserts 132 may include, but are not limited to, rubber, plastic, mica, stainless steel, or combinations thereof. Advantageously, use of the non-magnetic rotor-hub 108 enhances magnetic performance as non-magnetic material(s) of the rotor-hub 108 does not interfere with the operation of a magnetic circuit of the electric machine 100. Therefore, in the description hereinafter the rotor hub 108 is described as non-magnetic rotor hub 108.

The non-magnetic rotor hub 108 includes a hub body 114, a plurality of first protrusions 116, and a plurality of second protrusions 118. The hub body 114 is an annular structure and the first protrusions 116 and the second protrusions 118 are formed on a periphery of the hub body 114. Further, the first and second protrusions 116, 118 protrude radially from the hub body 114. In particular, as depicted in the embodiment of FIG. 1 where the rotor 104 is disposed concentrically inside the stator 102, the first protrusions 116 and the second protrusions 118 are located on an outer periphery of the hub body 114. Moreover, in the embodiment of FIG. 1, the first protrusions 116 and the second protrusions 118 protrude radially outwardly from the hub body 114. However, in some embodiments where the rotor 104 is disposed concentrically outside the stator 102, the first protrusions 116 and the second protrusions 118 may be located on an inner periphery of the hub body 114 and protrude radially inwardly from the hub body 114.

Figure 2:
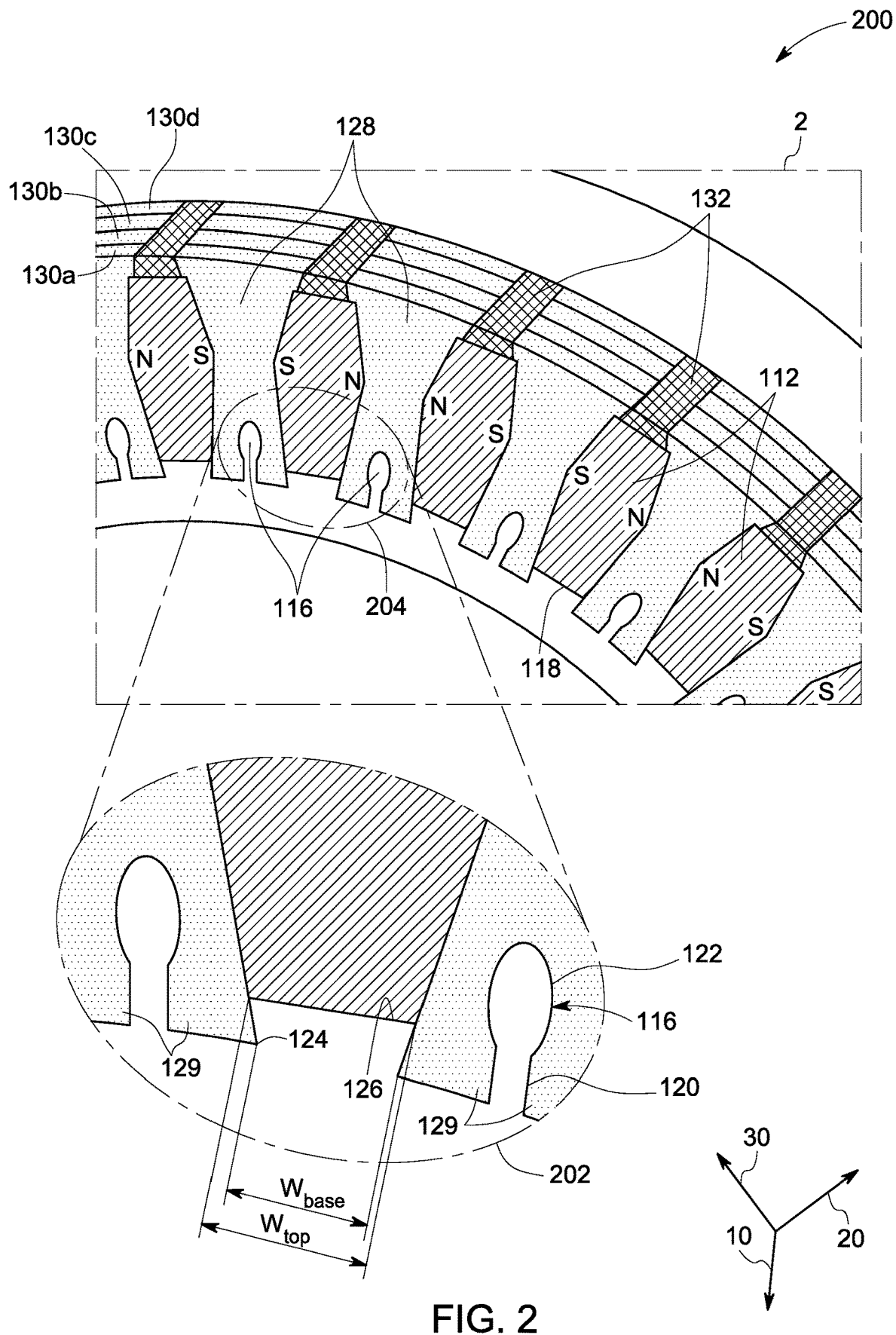
FIG. 2 is an enlarged view of a portion of a rotor of the electric machine of FIG. 1, in accordance with one embodiment of the present specification.
Figure 3:
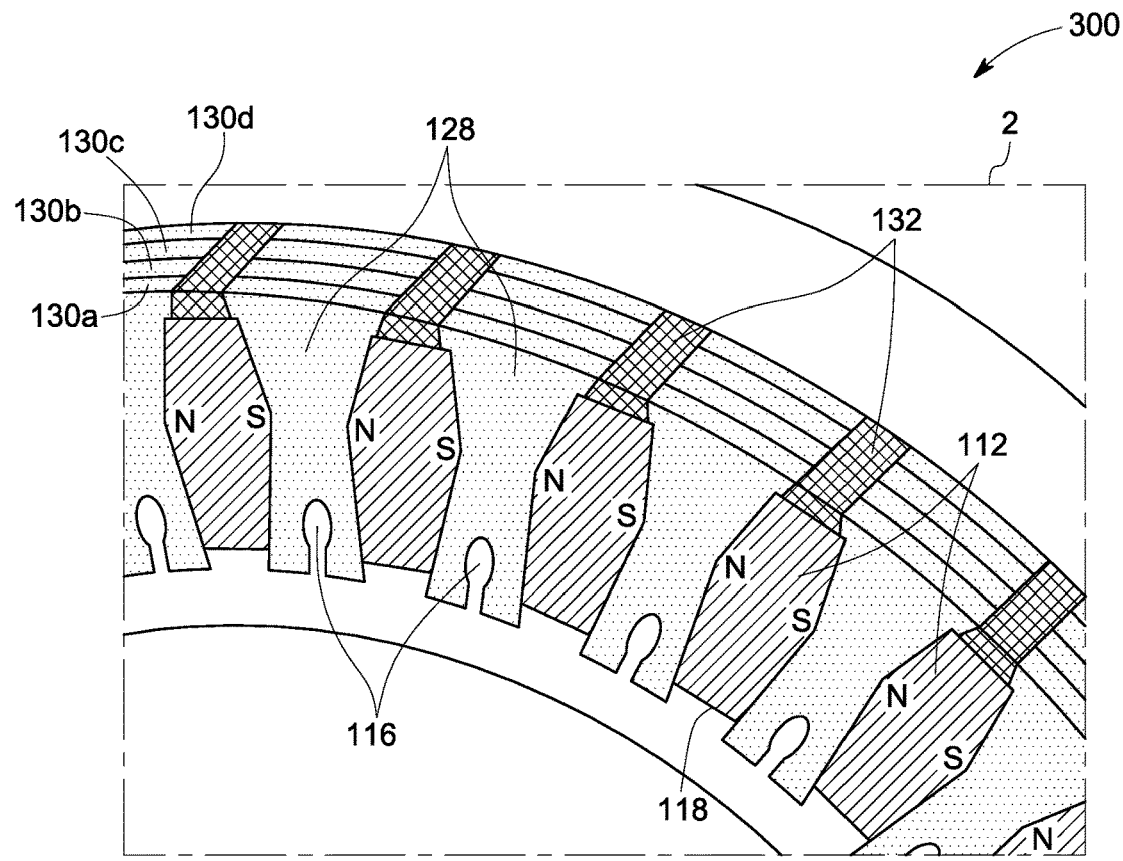
FIG. 3 is an enlarged view of a portion of a rotor of the electric machine of FIG. 1, in accordance with another embodiment of the present specification.
Figure 4:
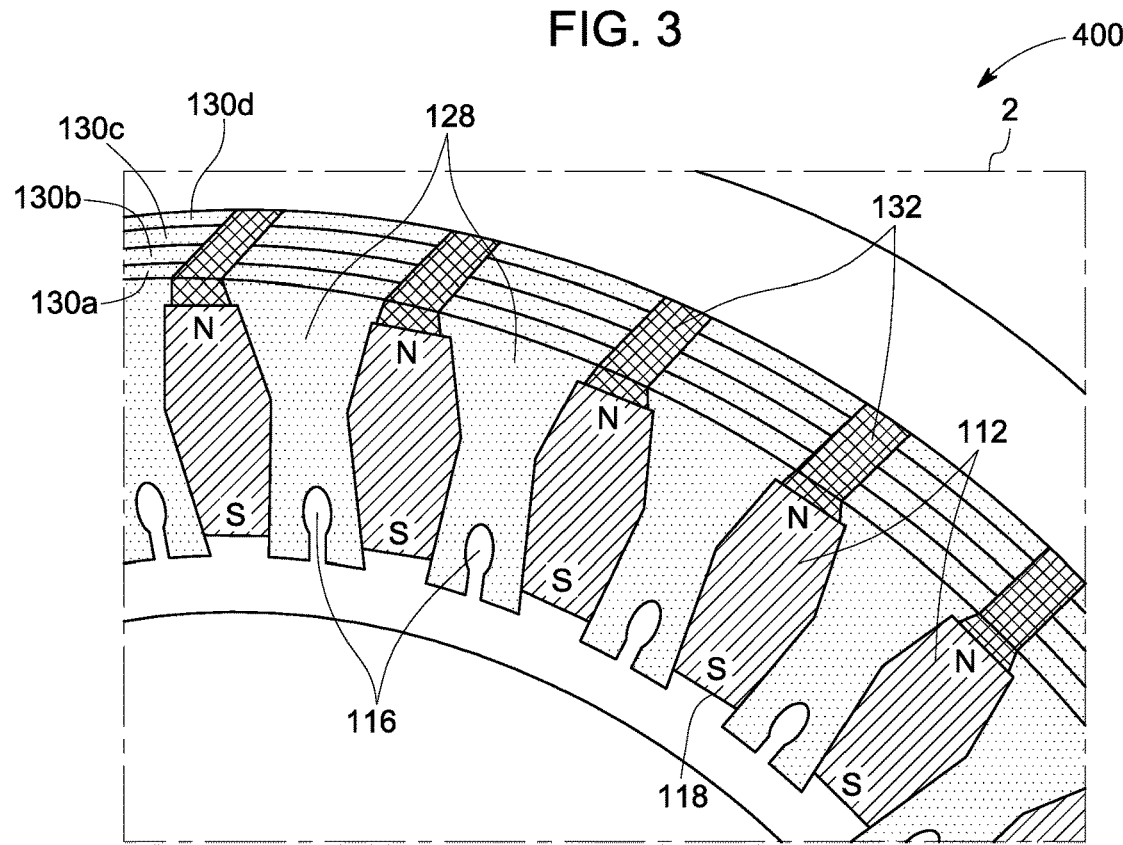
FIG. 4 is an enlarged view of a portion of a rotor of the electric machine of FIG. 1, in accordance with another embodiment of the present specification.
Figure 5:
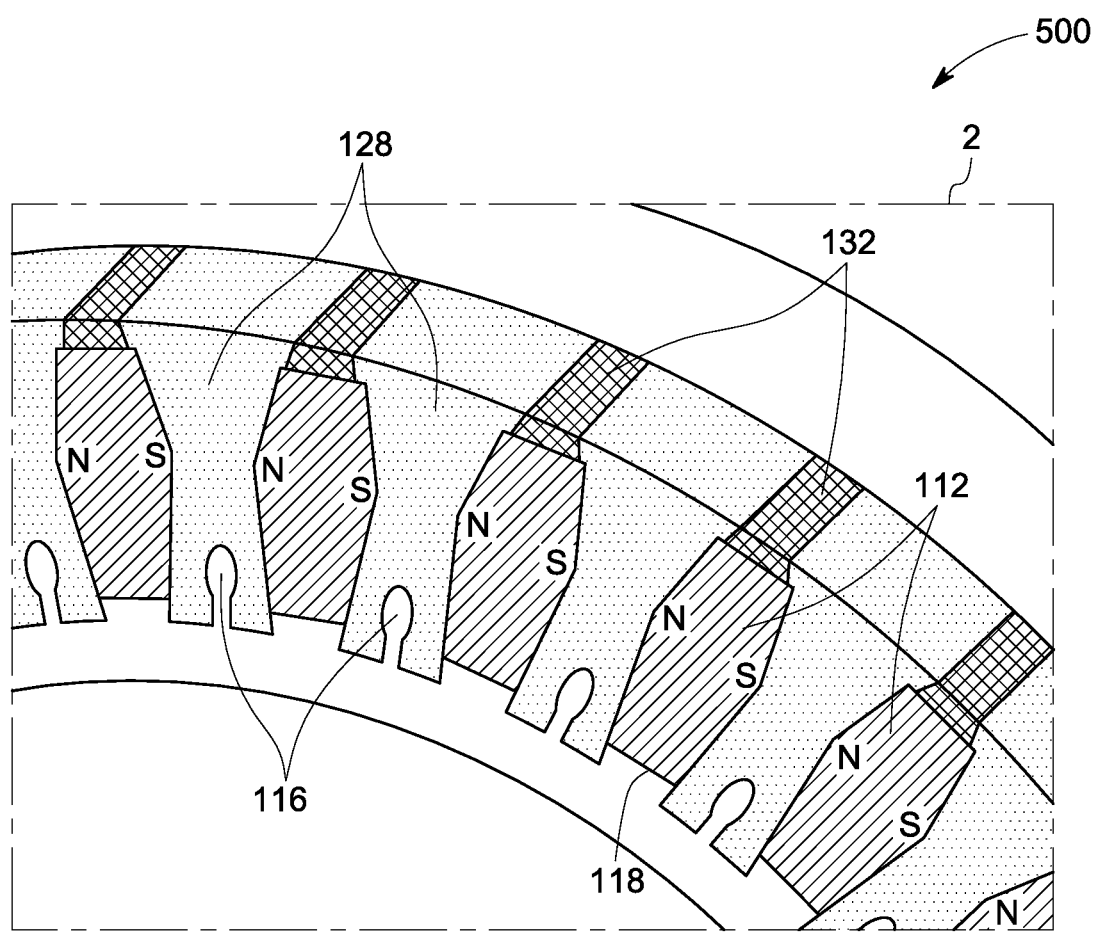
FIG. 5 is an enlarged view of a portion of a rotor of the electric machine of FIG. 1, in accordance with yet another embodiment of the present specification.

Further, in order to describe additional detailed information about a structure of the rotor 104, FIG. 1 is described in conjunction with various enlarged views of portions of the rotor 104, for example, using enlarged views shown in FIGS. 2-5. By way of example, FIG. 2 depicts an enlarged view 200 of a portion 2 of the rotor 104 of the electric machine 100 of FIG. 1, in accordance with one embodiment of the present specification. Further, FIG. 3 is an enlarged view 300 of the portion 2 of the rotor 104 of the electric machine 100 of FIG. 1, in accordance with another embodiment of the present specification. Furthermore, FIG. 4 is an enlarged view 400 of the portion 2 of the rotor 104 of the electric machine 100 of FIG. 1, in accordance with another embodiment of the present specification. Moreover, FIG. 5 is an enlarged view 500 of a portion 2 of the rotor 104 of the electric machine 100 of FIG. 1, in accordance with one embodiment of the present specification.

In some embodiments, as depicted in more details in the enlarged view 200 of FIG. 2, one or more first protrusions of the plurality of first protrusions 116 includes an elongated portion 120 and a head portion 122. The head portion 122 may include a bulged shape (as depicted in FIGS. 2-5), a plurality of teeth (not shown), or a combination thereof. In some embodiments, the plurality of teeth may also be formed on the elongated portion 120. By way of example, the first protrusion 116 may have a shape similar to a Christmas tree.

Further, one or more second protrusions of the plurality of second protrusions 118 include a wedge-shaped profile. In particular, as shown in an expanded view 202 of a region 204 of the rotor module 106, the wedge-shaped profile of the second protrusions 118 includes a base portion 124 and a top portion 126. In accordance with aspects of the present specification, a width ($W_{top}$) of the top portion 126 is more than a width ($W_{base}$) of the base portion 124. Advantageously, the alternating first and second protrusions 116, 118 transfer the mass loading of the magnetic elements (e.g., the magnetic core 110 and/or the permanent magnets 112) to the hub body 114.

Moreover, the magnetic core 110 includes a plurality of core members 128. The core members 128 are disposed on the non-magnetic rotor hub 108, where a core member 128 of the plurality of core members 128 is disposed between adjacent second protrusions 118 of the plurality of second protrusions 118 such that the head portion 122 of the first protrusion 116 that is located between the adjacent second protrusions 118 engages with the core member 128. Moreover, each of the one or more second protrusions 118 extends at least partially in a space between adjacent core members 128 of the plurality of core members 128. Such an arrangement of the core members 128 and the first and second protrusions 116, 118 creates a dynamic lock between the core members 128 and the second protrusions 118. For example, during operation of the electric machine 100, when radial forces are exerted on the core members 128, the core members 128 tend to drift radially away from their positions. However, the head portion 122 of the first protrusions 116 may cause flaring/widening of legs 129 of the core members 128. Such widening of the legs 129 further pushes the legs 129 toward side edges of the second protrusions 118. Due to the wedge shape of the second protrusions 118, a radial movement of the core members 128 may be restricted, thereby improving structural integrity of the rotor 104. Advantageously, an additional rotor wrapping, which is traditionally being utilized to hold the magnetic members of a conventional rotor in place, is not required for the rotor 104, in accordance with the aspects of the present specification. Also, lack of such additional rotor wrapping or layers of material not only reduces overall cost of materials but also result in a compact structure of the electric machine 100.

In some embodiments, one or more core members 128 of the plurality of core members 128 of the magnetic core 110 have laminated structure. By way of example, as depicted in FIGS. 2-4, each core member 128 is shown to include four laminations 130a, 130b, 130c, and 130d. In some other embodiments, the core members 128 may include any number of laminations, without limiting the scope of the present specification. The laminations 130a-130d in each of the one or more core members 128 are stacked in the axial direction 20 of the electric machine 100. It will be appreciated that the laminations 130a-130d are made from an appropriate magnetic steel to support the objective of high magnetic field in the air gap with an acceptable amount of loss within the rotor 104. Non-limiting examples of the magnetic steel used to form the laminations 130a-130d may include silicon steel, nickel steel, or combinations thereof. Alternatively, the laminations 130a-130d may be formed using sintered magnetic composites, also known as soft magnetic composites (SMC). In some embodiments, the laminations 130a-130d may be heat-treated to provide continuous laminations of a bi-state magnetic material. Non-limiting examples of the bi-state magnetic material include dual phase ferromagnetic material with a composition of Iron (Fe), 17.5% Chromium (Cr), 2% Nickel (Ni), 0.8% Aluminum (Al), 0.5% Carbon (C). In other non-limiting example of the dual phase ferromagnetic material, Cobalt is added to increase the magnetization. In yet another non-limiting example of dual phase ferromagnetic material, chromium may be replaced by weaker carbide forms, such as Mn. This increases the magnetization and further reduces the thermal gradient required to create the dual-phase structure. In another embodiment, the laminations 130a-130d may be subjected to a localized surface treatment to form the non-ferromagnetic regions.

In certain embodiments, the one or more core members 128 of the plurality of core members 128 may have non-laminated structure, as depicted in FIG. 5. For example, as shown in FIG. 5, each of the core members 128 is formed of a piece of material that is non-laminated. Further, in certain other embodiments, while some of the core members 128 have laminated structure, the remaining core members 128 may have the non-laminated structure.

Additionally, the rotor module 106 includes the plurality of permanent magnets 112. A permanent magnet 112 of the plurality of permanent magnets 112 is disposed in a space between the adjacent core members 128. The permanent magnets 112 generate a magnetic field that is radially directed (i.e., in the rotor of FIGS. 2, 4, and 5) in an air gap between the rotor 104 and the stator 102. The magnetic field generated by the permanent magnets 112 induces voltage in the stator winding disposed on the stator 102. In particular, the permanent magnets 112 provide an arrangement, which is a dovetail spoke configuration, particularly well-suited for high-speed applications. The dovetail spoke configuration provides for superior magnetic flux-concentration effects, thereby enhancing the power density of the electric machine 100. The permanent magnets 112 may be made of materials, including but not limited to, neodymium-iron-boron, samarium-cobalt, or ferrite, or alnico. Further, although thirty permanent magnets 112 are shown in the embodiment of FIG. 1, any suitable number of permanent magnets may be used in the rotor 104, without limiting the scope of the present specification.

In some embodiments, the plurality of permanent magnets 112 may be disposed in the spaces between adjacent core members 128 such that the plurality of permanent magnets 112 is magnetized in the tangential direction 30 of the electric machine 100, as shown in FIGS. 2, 3, and 5. As depicted in FIGS. 2, 3, and 5, the north and south poles of the permanent magnets 112 are oriented along the tangential direction 30 of the electric machine 100. For example, in the embodiments of FIGS. 2 and 5, the permanent magnets 112 are arranged such that magnet poles having like polarity face each other with the corresponding core member 128 therebetween. Advantageously, such arrangement of the permanent magnets 112 forces the magnetic field from the permanent magnets 112 out through radial faces of the core member 128 into an air gap between the rotor 104 and the stator 102 where the magnetic field can interact with the magnetic field produced by the stator windings. Alternatively, in the embodiment of FIG. 3, the permanent magnets 112 are arranged such that opposite poles of the permanent magnets 112 face each other with the corresponding core member 128 therebetween.

In certain embodiments, as depicted in FIG. 4, the plurality of permanent magnets 112 may be disposed in the spaces between adjacent core members 128 such that the plurality of permanent magnets 112 is magnetized in the radial direction 10 of the electric machine 100. In such a configuration of the rotor module 106, the poles of the permanent magnets 112 are aligned along the radial direction 10 of the electric machine 100.

Further, in certain embodiments, as depicted in various drawings the core members 128 are designed such that the spaces between adjacent core members 128 have a Diamond-like shape. Advantageously, such Diamond-like shaped spaces retain the permanent magnets 112 in place against the radial forces during operation of the electric machine 100. Additionally, in some embodiments, the rotor 104 may include a plurality of non-magnetic inserts 132 to further ensure retention of the permanent magnets 112. The non-magnetic inserts 132 may be disposed such that one non-magnetic insert 132 is disposed between the adjacent core members 128 toward one end of the corresponding permanent magnet 112 to retain the permanent magnet 112 in the space between the adjacent core members 128 against radial forces caused due to rotations of the rotor 104 during the operation of the electric machine. Examples of non-magnetic materials used to form the non-magnetic inserts 132 may include, but are not limited to, rubber, plastic, mica, stainless steel, or combinations thereof. In some embodiments, the non-magnetic inserts 132 may also be formed using one or more dual-phase materials, in which case the inserts 132 can bridge the core members 128.

Figure 6:
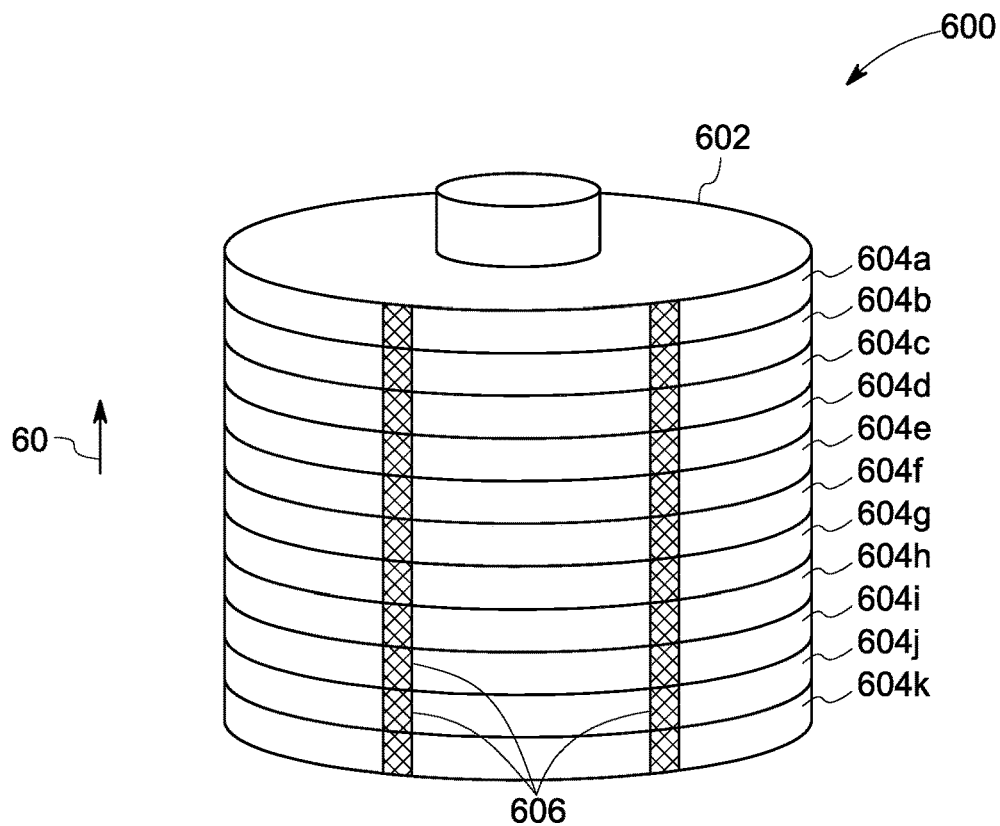
FIG. 6 is a perspective view of a rotor of an electric machine, in accordance with one embodiment of the present specification.
Figure 7A:
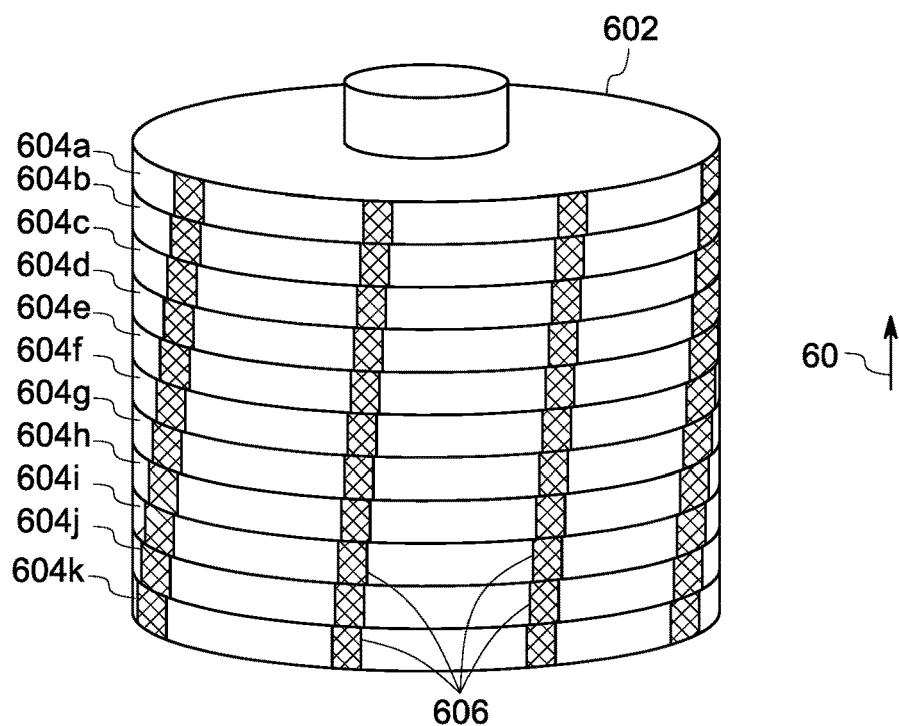
FIGS. 7A-7C are perspective views of rotors, in accordance with some embodiments of the present specification.
Figure 7B:
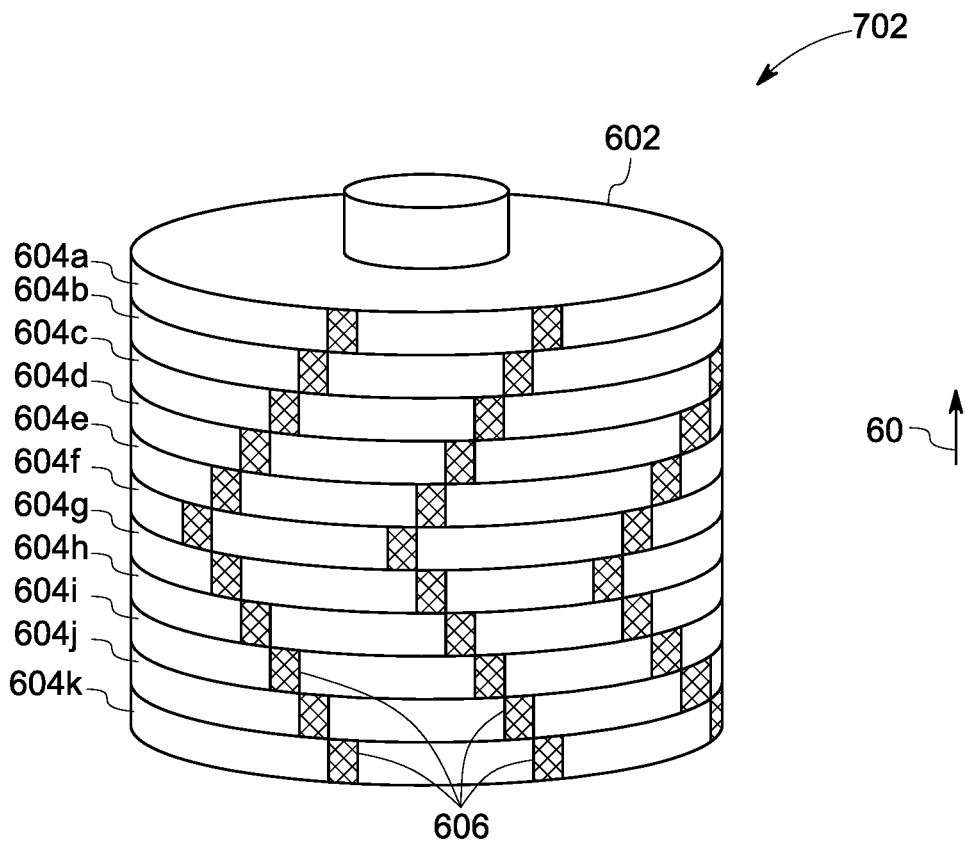
Figure 7C:
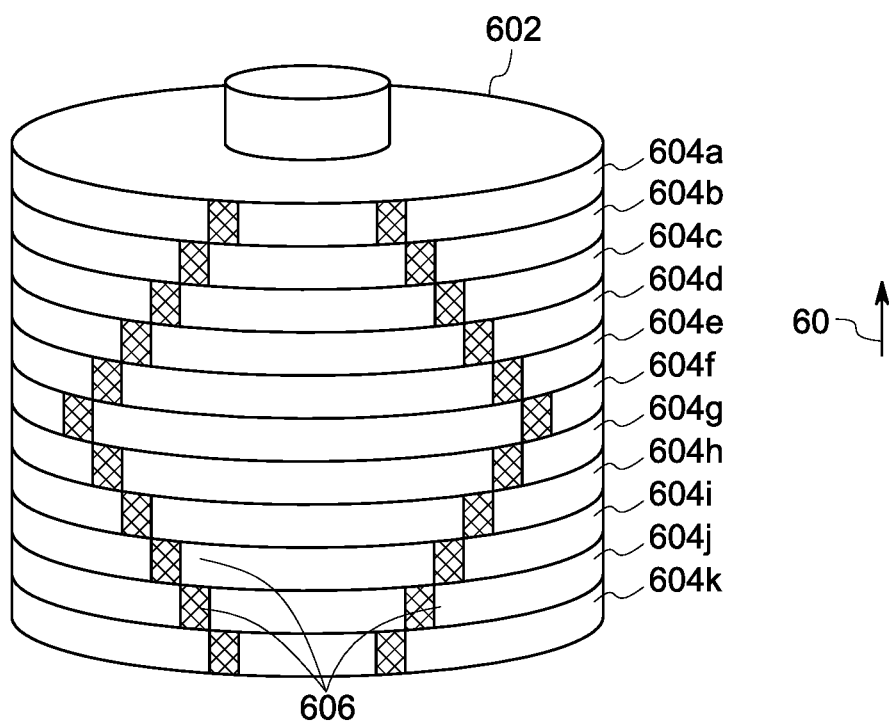

Referring now to FIG. 6, a perspective view 600 of a rotor 602, in accordance with one embodiment of the present specification. As previously noted, the rotor 104 of the electric machine 100 may include two or more rotor modules. The rotor 602 of FIG. 6, represents one such embodiment of the rotor 104. As depicted in FIG. 6, the rotor 602 is shown to include eleven rotor modules 604a through 604k. The rotor modules 604a-604k are stacked the axial direction 20 the electric machine (e.g., the electric machine 100) in a non-skewed configuration as shown in FIG. 6. For example, the rotor modules 604a-604k may be stacked in the axial direction 20 such that the non-magnetic insert 132 of all the rotor modules 604a-604k are aligned with each other. However, in certain embodiments, the rotor modules 604a-604k may be stacked the axial direction 20 in a skewed configuration as shown in FIGS. 7A-7C, in accordance with one embodiment of the present specification. For example, as depicted a rotor configuration 700 of FIG. 7A, each rotor module is displaced by a fixed angle from an adjacent rotor module in a single direction (e.g., in a clockwise direction). In certain embodiments, the rotor modules may also be displaced by an irregular angle from adjacent rotor modules. In another example configuration 702 of FIG. 7B, the rotor modules are shown as skewed in a symmetrical fashion with respect to the middle rotor module 604F. In general, the rotor configurations 700 and 702 depicts a stepped skewing of the rotor modules 604a-604k. Whereas, a rotor configuration 704 of FIG. 7C, depicts a sinusoidal skewing of the rotor modules 604a-604k. It will be appreciated that other type of skewing arrangements that are different than those depicted in FIGS. 7Aa-7C may also be employed without limiting the scope of the present specification. Advantageously, skewing arrangements as depicted in FIGS. 7A-7C, aids in reducing cogging torque and electromagnetic torque ripples in the electric machine 100.

Figure 8:
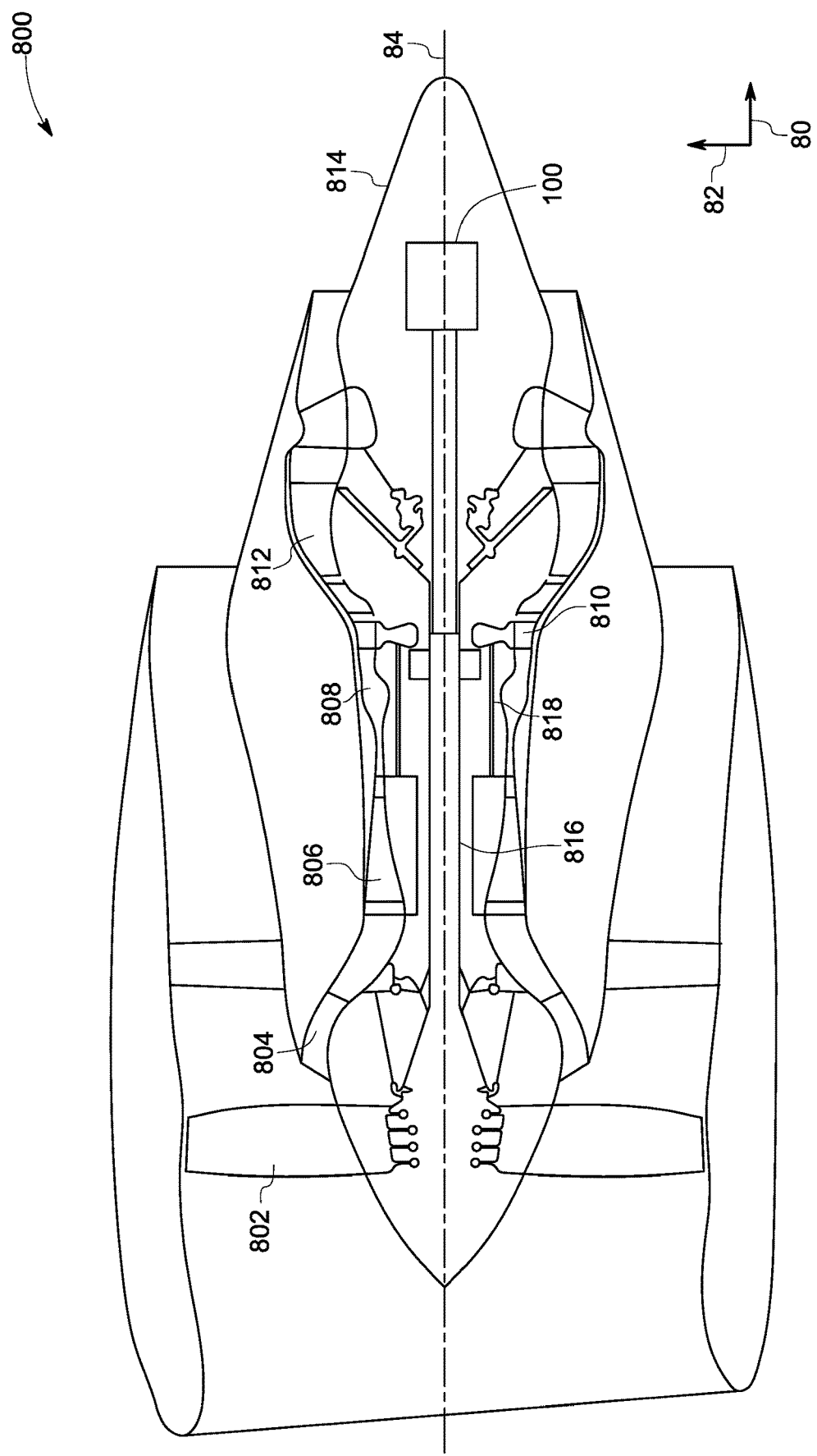
FIG. 8 is a cross-sectional perspective view of a turbo machine having an electric machine, in accordance with one embodiment of the present specification.

The electric machine 100 of FIG. 1 is suitable for use in applications including, but not limited to, automobiles, various industrial machines, turbo machines used in aircraft engines, or combinations thereof. By way of non-limiting example, FIG. 8 represents a cross-sectional perspective view of a turbo machine 800 having an electric machine, for example, the electric machine 100 of FIG. 1, in accordance with one embodiment of the present specification. In FIG. 8, reference numerals 80 and 82 respectively represent an axial direction and a radial direction of the turbo machine 800. Further, a reference numeral 84 represents a centerline of the turbo machine 800.

In some embodiments, the turbo machine 800 may include a fan 802, a low-pressure compressor (LPC) 804, a high-pressure compressor (HPC) 806, a combustor assembly 808, a high-pressure turbine (HPT) 810, a low-pressure turbine (LPT) 812, and a tail cone 814, arranged serially in the axial direction 80 of the turbo machine 800, as depicted in FIG. 1. The LPC 804 is coupled to the LPT 812 via a first shaft 816. The HPC 806 is coupled to the HPT 810 via a second shaft 818 that is arranged concentric to the first shaft 816. In some embodiments, the LPC 804, the HPC 806, the HPT 810, and/or the LPT 812 may include a plurality of stages (not shown). Each stage may include a plurality of blades (not shown) mounted on the respective shafts 816, 818.

During operation of the turbo machine 800, the fan 802 diverts a portion of fluid (e.g., air) toward the LPC 804. The LPC 804 compresses the incoming fluid and directs the compressed fluid to the HPC 806. The HPC 806 further compresses the fluid received from the LPC 804 and discharges the compressed fluid to the combustor assembly 808. The compressed fluid is mixed with one or more fuels in the combustor assembly 808. Subsequently, the mixture of the compressed fluid and the one or more fuels is combusted within the combustor assembly 808 to form a combustion gas. The combustion gas is discharged from the combustor assembly 808 to the turbines 810, 812. The combustion gas is expanded in the HPT 810 and the LPT 812 thereby rotating the HPT 810 and the LPT 812.

In accordance with the aspects of the present specification, the electric machine 100 of FIG. 1 may be disposed inside the tail cone 814. However, in certain other embodiments, the electric machine 100 may alternatively or additionally be disposed at various locations in the turbo machine 800 of FIG. 8 without limiting the scope of the present specification. The electric machine 100, when disposed in the tail cone 814, may be operated as a generator or motor.

In some embodiments, the electric machine 100 may be mechanically coupled to the LPT 812. In particular, a hub body 114 of the rotor 104 may be mechanically coupled to the LPT 812 via the first shaft 816. Consequently, the rotations of the LPT 812 results in the rotations of the rotor 104 of the electric machine 100. In some embodiments, the hub body 114 of the rotor 104 of the electric machine 100 is directly coupled to the first shaft 816. Accordingly, the rotor 104 of the electric machine 100 may rotate at a rotational speed of the first shaft 816.

In certain other embodiments (see FIGS. 9 and 10), to reduce a torque requirement of an electric machine, e.g., the electric machine 100, the turbo machine 800 may include a gear box that may be connected to the rotor 104 of the electric machine 100 and the first shaft 816. As will be appreciated the gear box may be used to control rotational speed of the rotor of the electric machine 100. In particular, the gearbox increases the rotational speed of the electric machine, thereby reducing the torque required of the electric machine.

Figure 9:
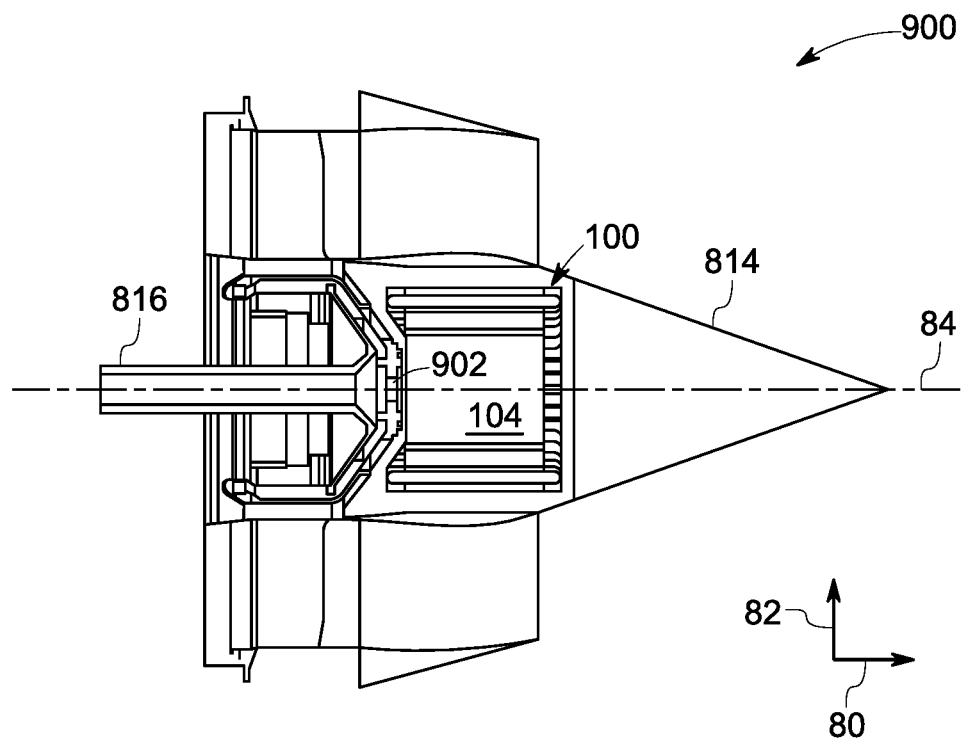
FIG. 9 is a cross-sectional view of a portion of a turbo machine having a gear box connected to an electric machine, in accordance with one embodiment of the present specification.

Referring now to FIG. 9, a cross-sectional view 900 of a portion of a turbo machine, for example, the turbo machine 800 is presented in accordance with one embodiment of the present specification. As depicted in FIG. 9, the rotor 104 of the electric machine 100 and is coupled to the first shaft 816 via a gear box 902. In the embodiment of FIG. 9, the gear box 902 is disposed axially between the LPT 812 and the electric machine 100. In particular, the gear box 902 is connected axially between the first shaft 816 and the rotor 104 of the electric machine 100. In some embodiments, during operation of the turbo machine 800, the gear box 902 increases the rotational speed of the electric machine 100, thereby reducing a torque required of the electric machine 100.

Figure 10:
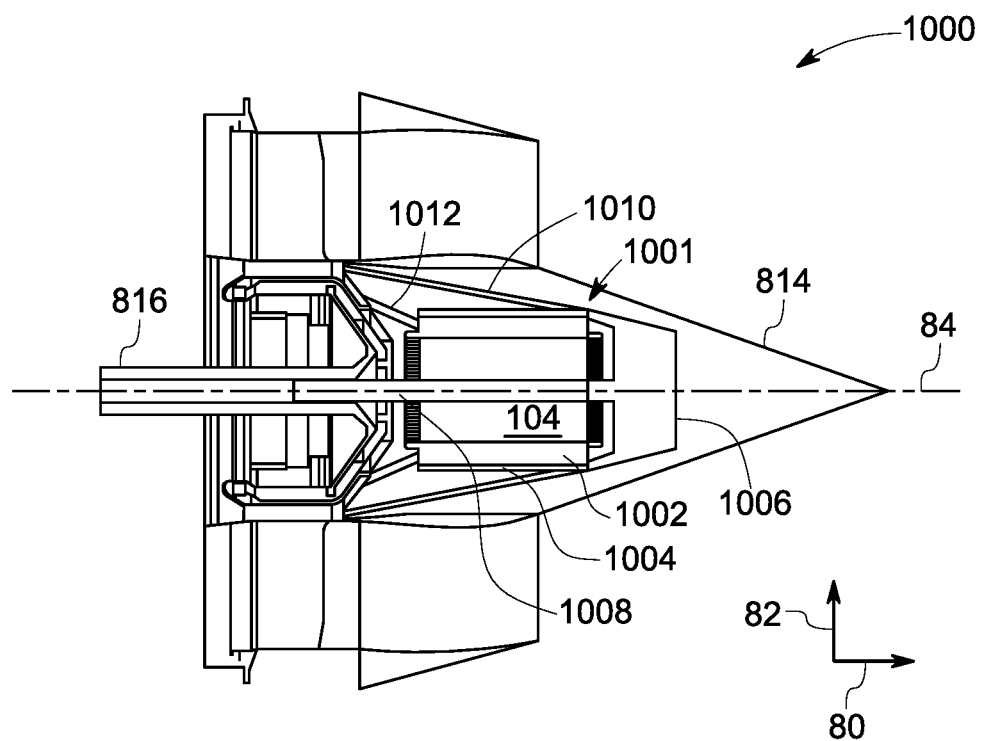
FIG. 10 is a cross-sectional view of a portion of a turbo machine having a gear box connected to an electric machine, in accordance with another embodiment of the present specification.

Moving now to FIG. 10, a portion 1000 of a turbo machine, for example, the turbo machine 800 is presented in accordance with one embodiment of the present specification. In particular, FIG. 10 depicts an electric machine 1001 that is one embodiment of the electric machine 100 of FIG. 1 however, with an inverted configuration. For example, the electric machine 1001 includes a stator 1002 and rotor 1004, where the rotor 1004 is disposed concentrically outside the stator 1002. As will be appreciated, the rotor 1004 may have a configuration similar to the rotor 104 of FIG. 1 with appropriate modifications to achieve such inverted configuration. In some embodiments, the electric machine 1001 may be connected to a structure of the turbo machine 800 via a stator support mount 1005.

Further, the rotor 1004 of the electric machine 1001 is coupled to the first shaft 816 via a gear box 1006. The gear box 1006 may be connected to a structure of the turbo machine via a gear shaft support mount 1007. In the embodiment of FIG. 10, the gear box 1006 is disposed aft of the electric machine 1001. In particular, the gear box 1006 is connected to the first shaft 816 via a passage within the electric machine 1001. As shown in FIG. 10, the gear box 1006 is connected to the rotor 1004 at the aft side. Further, the gear box 1006 is coupled to the first shaft 816 via a gear shaft 1008 that passes through the stator 1002. In some embodiments, during operation of the turbo machine 800, the gear box 1006 increases the rotational speed of the electric machine 1001, thereby reducing a torque required of the electric machine 1001.

In accordance with aspects of the present application, the electric machine 100, 1001 provides a compact structure in comparison to traditional electric machines with the conventional rotors. Such compact structure is achieved at least partially due to features such as the first and second protrusions 116, 118 in the rotor 104. In particular, the arrangement of the core members 128 and the first and second protrusions 116, 118 creates a dynamic lock between the core members 128 and the second protrusions 118 when radial forces are exerted on the core members 128, the core members 128. Due to the wedge shape of the second protrusions 118f, a radial movement of the core members 128 may be restricted, thereby improving structural integrity of the rotor 104. Advantageously, an additional rotor wrapping, which is traditionally being utilized to hold the magnetic members of a conventional rotor in place, is not required for the rotor 104, in accordance with the aspects of the present specification. Also, the lack of such additional rotor wrapping or layers of material not only reduces overall cost of materials but also result in a compact structure of the electric machine 100. Further, such compact structure makes the electric machine 100, 1001 suitable for use in places such as tail cone 814 in the turbo machine, such as the turbo machine 800. Moreover, the permanent magnets 112 provide an arrangement, which is a dovetail spoke configuration, particularly well-suited for high-speed applications. The dovetail spoke configuration provides for superior magnetic flux-concentration effects, thereby enhancing the power density, and hence, an efficiency of the electric machine 100, 1001.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. Aspects from the various embodiments described, as well as other known equivalents for each such aspects, can be mixed and matched by one of ordinary skill in the art to construct additional embodiments and techniques in accordance with principles of this application.

The invention claimed is:

1. An electric machine, comprising:
a stator; and
a rotor disposed concentric to the stator, the rotor comprising at least one rotor module, wherein a rotor module of the at least one rotor module comprises:
 a rotor hub comprising:
  a hub body; and
  a plurality of elongate protrusions and a plurality of wedge protrusions located alternatingly on a periphery of the hub body and protruding radially from the hub body, each elongate protrusion of the plurality of elongate protrusions comprising an elongated portion and a head portion, wherein each wedge protrusion of the plurality of wedge protrusions has a trapezoidal-shaped profile, is unitarily formed with the hub body, and has a base portion and a top portion, wherein a width of the top portion is longer than a width of the base portion;
 a magnetic core comprising a plurality of core members disposed on the rotor hub, wherein the head portion of a first elongate protrusion of the plurality of elongate protrusions engages with a first core member of the plurality of core members, and wherein a first wedge protrusion of the plurality of wedge protrusions extends at least partially in a space between the first core member and a second, circumferentially adjacent, core member of the plurality of core members; and
 a plurality of permanent magnets, wherein a first permanent magnet of the plurality of permanent magnets is disposed in a space between the first core member and the second core member,
wherein the rotor further comprises a non-magnetic insert disposed between the first core member and the second core member to retain the first permanent magnet in the space between the first core member and the second core member, wherein the first core member has a first side edge contacting the first permanent magnet and a second, opposite, side edge, wherein, along a radial direction of the electric machine, the first and second side edges converge towards one another until they reach an inflection point, and diverge from one another beyond the inflection point, wherein the space between the first core member and the second core member has a diamond-like shape, wherein the head portion of the first elongate protrusion is located radially inward of the inflection point, wherein the rotor further comprises a non-magnetic insert disposed between the first core member and the second core member to retain the first permanent magnet in the space between the first core member and the second core member, wherein the first core member has a first side edge contacting the first permanent magnet and a second, opposite, side edge, wherein, along a radial direction of the electric machine, the first and second side edges converge towards one another until they reach an inflection point, and diverge from one another beyond the inflection point, wherein the space between the first core member and the second core member has a diamond-like shape, and wherein the head portion of the first elongate protrusion is located radially inward of the inflection point.

2. The electric machine of claim 1, wherein the head portion of the first elongate protrusion comprises a bulged shape, a plurality of teeth, or a combination thereof, and wherein first wedge protrusion further comprises a planar top edge contacting the first permanent magnet and a planar side edge extending between the base portion and the top edge, the planar side edge contacting the first core member.

3. The electric machine of claim 1, wherein one or more core members of the plurality of core members are laminated, and wherein laminations in each of the one or more core members are stacked in an axial direction of the electric machine.

4. The electric machine of claim 1, wherein one or more core members of the plurality of core members are non-laminated.

5. The electric machine of claim 1, wherein the plurality of permanent magnets is magnetized in a tangential direction of the electric machine.

6. The electric machine of claim 1, wherein the plurality of permanent magnets is magnetized in a radial direction of the electric machine.

7. The electric machine of claim 1, wherein the plurality of permanent magnets is disposed such that magnet poles having like polarity face each other.

8. The electric machine of claim 1, wherein the at least one rotor module comprises one rotor module, wherein an axial length of the rotor module is substantially equal to an axial length of the stator.

9. The electric machine of claim 1, wherein the at least one rotor module comprises two or more rotor modules stacked in an axial direction of the electric machine in a skewed configuration.

10. The electric machine of claim 1, wherein the at least one rotor module comprises two or more rotor modules stacked in an axial direction of the electric machine in a non-skewed configuration.

11. The electric machine of claim 1, wherein the rotor is disposed concentrically inside the stator, and the periphery of the hub body is an outer periphery of the hub body.

12. The electric machine of claim 1, wherein the rotor is disposed concentrically outside the stator, and the periphery of the hub body is an inner periphery of the hub body.

13. The electric machine of claim 1, wherein the rotor hub is made of one or more non-magnetic materials.

14. A turbo machine, comprising:
a turbine;
a tail cone disposed downstream of the turbine; and
the electric machine of claim 1 disposed inside the tail cone and mechanically coupled to the turbine.

15. The turbo machine of claim 14, wherein the turbine is a low-pressure turbine coupled to a low-pressure compressor via a first shaft.

16. The turbo machine of claim 15, wherein a rotor of the electric machine is directly coupled to the first shaft.

17. The turbo machine of claim 16, further comprising a gear box coupled to the rotor of the electric machine and the first shaft to control rotational speed of the rotor of the electrical machine.

18. The turbo machine of claim 17, wherein the gear box is disposed axially between the low-pressure turbine and the electric machine.

19. The turbo machine of claim 17, wherein the gear box is disposed aft of the electric machine.

* * * * *